(12) United States Patent
Shetty et al.

(10) Patent No.: US 11,893,504 B2
(45) Date of Patent: Feb. 6, 2024

(54) ENTERPRISE COMMUNICATION CHANNEL ASSISTANCE

(71) Applicant: VMware LLC, Palo Alto, CA (US)

(72) Inventors: Rohit Pradeep Shetty, Bangalore (IN); Ramanandan Nambannor Kunnath, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/891,206

(22) Filed: Aug. 19, 2022

(65) Prior Publication Data
US 2023/0419126 A1 Dec. 28, 2023

(30) Foreign Application Priority Data
Jun. 28, 2022 (IN) .............................. 202241036950

(51) Int. Cl.
*H04L 51/02* (2022.01)
*G06N 5/022* (2023.01)
*H04L 67/50* (2022.01)

(52) U.S. Cl.
CPC ............. *G06N 5/022* (2013.01); *H04L 51/02* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 2007/0274499 A1* | 11/2007 | Bennett ............... | H04M 1/2747 379/220.01 |
| 2009/0203352 A1* | 8/2009 | Fordon ................. | H04M 15/68 455/406 |
| 2010/0199188 A1* | 8/2010 | Abu-Hakima .......... | H04W 4/02 709/224 |
| 2013/0293363 A1* | 11/2013 | Plymouth ........... | H04L 63/1425 340/309.16 |
| 2016/0381533 A1* | 12/2016 | Fogelson ................ | H04W 4/18 455/414.1 |
| 2019/0140892 A1* | 5/2019 | Jain ......................... | H04L 41/16 |
| 2020/0007476 A1* | 1/2020 | Aniyan ................. | H04L 51/046 |
| 2022/0116345 A1* | 4/2022 | Xu .......................... | H04L 51/18 |
| 2023/0046839 A1* | 2/2023 | Raleigh ................. | H04M 15/83 |

* cited by examiner

*Primary Examiner* — James A Edwards
(74) *Attorney, Agent, or Firm* — King Intellectual Asset Management

(57) ABSTRACT

Disclosed are various approaches for determining an optimal communication channel for contacting a user. In one such embodiment, application usage data corresponding to user interactions on available communication channels within an enterprise environment is obtained and used to generate a knowledge graph representing an individual user communicating over two or more of the available communication channels with other users. Thus, based on the knowledge graph, at least one optimal communication channel can be provided for contacting the individual user, wherein the at least one optimal communication channel is represented in the knowledge graph.

20 Claims, 4 Drawing Sheets

ENTERPRISE COMMUNICATION CHANNEL ASSISTANCE

RELATED APPLICATIONS

Benefit is claimed under 35 U.S.C. 119(a)-(d) to Foreign Application Serial No. 202241036950 filed in India entitled "ENTERPRISE COMMUNICATION CHANNEL ASSISTANCE", on Jun. 28, 2022, by VMware, Inc., which is herein incorporated in its entirety by reference for all purposes.

BACKGROUND

Communication has been always critical for productivity in an enterprise. While there typically exist multiple communication channels that can be used to message another enterprise user, this leads to confusion among employees, resulting in delayed responses. Accordingly, it has always been a challenge for a user to decide which communication channel to use when reaching out to another individual within the enterprise so as receive a prompt response. As time is critical, it is imperative that an individual is contacted on the communication channel that elicits the fastest response.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
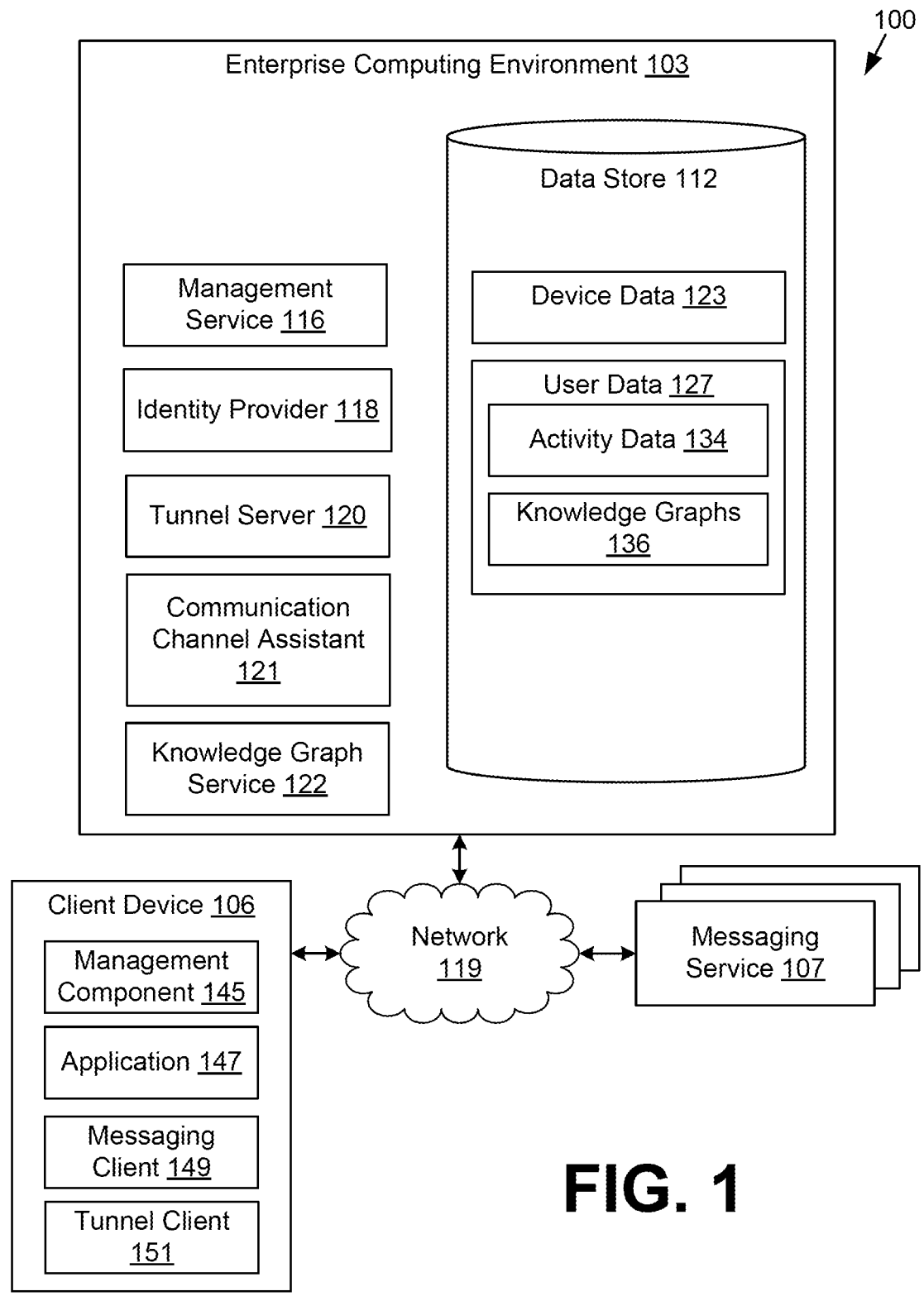
FIG. 1 is a block diagram depicting an example implementation according to various examples of the disclosure.

Disclosed are examples of an enterprise communication channel assistance system and related methods that determines an optimal communication channel in an enterprise setting. In situations, where an employee needs to reach out to another employee and receive a response in a timely manner, a user can interact with the enterprise communication channel assistance system which would then determine the optimal communication channel to be used to message the other employee based on various metrics. To do so, in certain embodiments, the enterprise communication channel assistance system utilizes a knowledge graph service that keeps track of interactions performed by enterprise users across various communication channels.

In accordance with embodiments of the present disclosure, an enterprise communication channel assistance system is employed that obtains various data points across enterprise communication channels that can be used to determine the optimal communication channel for contacting a particular user. The various data points can include interaction data between enterprise users with respect to particular communication channels, such as a general or average response time for a received message over a particular messaging application or service, a response time for a received message based on a topic, a response time for a received message based on the sender, a number or count of communications made between users, a time duration of the interaction, general availability of the user in each messaging service/application, an indication of current use of a client device (e.g., a heartbeat signal from user devices that is used to detect the client device on which the user is currently active), available communication/messaging applications installed on the active client device, current location of the user, etc. Based on the analysis of the data, communication channels can be categorized or ranked for an individual with respect to the individual's responsiveness and/or availability in engaging in communications over particular communication channels, such as email, video chat, text messaging, online chat, etc. and/or across different messaging platforms and services (e.g., GITHUB, JIRA, MICROSOFT TEAMS, SLACK, SKYPE, etc.).

Users within an enterprise often use various communication channels to communicate with other enterprise users, such as email, electronic chats, message boards, video conferencing, telephone conversations, online whiteboards, etc. User activity on the communication channels can be assessed through use of enterprise applications, network activity through a virtual private network (VPN) tunnel, activity detected through a single sign-on (SSO) service or identity manager, through VDI activity detected for the user, and device metrics that can be collected from a client device that is managed by a management service. In accordance with embodiments of the present disclosure, such electronic communications can be processed and analyzed to form various channel or messaging metrics related to response times between users, availability on particular communication channels, availability on particular client devices, responsiveness on particular client devices, etc. By analyzing the electronic communications specific to particular individuals, communication channels used by a particular individual can be ranked based on the collected metrics (e.g., response time) and the rankings can be used to train an enterprise communication channel assistance system to determine which communication channel is optimal for contacting a particular individual at a particular time and/or location.

FIG. 1 illustrates an example of a networked environment 100 according to examples of the disclosure. In the depicted network environment 100, an enterprise computing environment 103 is in communication with at least one client device 106 and an enterprise communication channel assistance system (also referred to as a "communication channel assistant") 121 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, an identity provider 118, a tunnel server 120, a communication channel assistant 121 and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116. The management service 116 can include a management console that can allow administrators to manage client devices 106 that are enrolled with the management service 116.

The enterprise computing environment 103 can also execute an identity provider 118. The identity provider 118 can carry out federated user authentication on behalf of an enterprise. For example, the identity provider 118 can implement OAuth, SAML, or similar protocols that allow for federated user authorization or authentication. In examples of this disclosure, the identity provider 118 can also verify a user-and-device token provided by a client device 106 to provide multi-device SSO capabilities as described herein. The identity provider 118 can verify a user's credentials or identity and provide an authentication token, such as a SAML assertion, that can be provided to an application service, e.g., a messaging service 107, by an application on a client device 106 to authenticate the user's access to a service provided by the application service. The identity provider 118 can issue the authentication token to a client device 106 after verifying the identity of the user and/or client device 106 from which the user is attempting to access the application service. In the context of this disclosure, once a user has authenticated his identify from a first device, the identity provider 118 can authenticate the user from a second device that is managed by the management service 116 upon receiving a user-and-device token from the second device, where the user-and-device token can be verified by the identity provider 118.

The identity provider 118 can verify a user-and-device token issued by the management service 116 to a client device 106 that is enrolled as a managed device and that is associated with a particular user account. The user-and-device token can include information that allows the identity provider 118 to verify the user as well as the device. The user-and-device token can be signed so that the identity provider 118 can verify the authenticity of the token itself. If the user has already established his identity with the identity provider 118 from a first device, and the identity provider 118 subsequently receives a user-and-device token from a second device, the identity provider 118 can establish a SSO session with the second device if the user-and-device token can be validated. Validation can be performed by verifying the signature applied to the user-and-device token as well as the user and device identifying information contained within the token.

In some embodiments, the identity provider 118 can be implemented in a separate computing environment or by a separate entity than the management service 116. The management service 116 can provide an application programming interface (API) with which the identity provider 118 can communicate to verify a user-and-device token or to obtain a public key with which the signature of a user-and-device token can be verified. The management service 116 can also provide an API through which the identity provider 118 can verify user identifiers or device identifiers that are embedded within a user-and-device token.

The management service 116 and/or identity provider 118 can also receive application usage data from applications or a management component installed on the client device 106. Applications on the client device 106 can report time and date information associated with application usage, such as a number of interactions, via a communication channel or service, between enterprise users on various topics, number of answers or replies given on specific topics by enterprise users, response times in responding to received messages, etc.

Additionally, cloud-based services can report login and logout information to the management service 116 or identity provider 118. A SSO client application that operates as a hub to access enterprise applications can be installed on a client device 106 and report usage of enterprise applications to the management service 116 or identity provider 118.

The management service 116 or identity provider 118 can also obtain usage of VDI (Virtual Desktop Infrastructure) resources associated with a user from a VDI infrastructure environment. A VDI infrastructure environment can utilize the identity provider 118 for identity management and also to report usage data to the management service 116 in some instances.

The tunnel server 120 can provide a virtual private network connection, or a VPN tunnel to an enterprise or private network. The VPN tunnel can be provided to client devices associated with users of the enterprise. The VPN tunnel can be initiated by a tunnel client running on a client device 106 and terminated at the tunnel server 120. The tunnel server 120 can utilize TLS, SSL, or other encryption methodologies to secure a network connection between the client device 106 and the tunnel server 120. The network connection can also be specific to certain apps that are running on the client device 106, such as a tunnel client or other applications on the client device 106 that utilize per-app VPN capabilities of an operating system on the client device 106.

The communication channel assistant 121 can analyze user data associated with users of the enterprise, such as knowledge graphs 136 generated by a knowledge graph service 122 that link individual team members with communication channels that they use in conversing with other users. Then, based on the knowledge graphs, the communication channel assistant 121 can generate a list of communication channels that are ranked based on their usage by an individual and/or can generate a channel score or grade for individual users based on messaging and channel metrics. Accordingly, the knowledge graph service 122 can derive the knowledge graph of a user based upon observation of previous behavior with other users over various communication channels. For example, behavior over a period of time can be observed and knowledge graph can be formed based upon the observed behavior (e.g., communications over a communication channel with other users).

Knowledge graphs 136 can be stored in the data store 112 in association with a user. The communication channel assistant 121 can update the knowledge graph of a user periodically, such as according to a regular schedule, or dynamically as information is updated. The data stored in the data store 112 can include device data 123, user data 127, and potentially other data. Device data 123 can include records to client devices 106 that are enrolled as managed devices with the management service 116. A record within device data 123 can include various security settings selected for enforcement on a client device 106 that is enrolled with the management service 116. Accordingly, a device record can include a device identifier associated with a device, such as the client device 106 and other data associated with managed devices. In some examples, device data 123 can also identify a user associated with or assigned to a particular client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

User data 127 contains information about user accounts in a user directory. User accounts can be maintained by a directory service or the identity provider 118. The user accounts can be associated with client devices 106 that are enrolled with the management service 116. The user data 127 can be associated the same user accounts that are verified by the identity provider 118. In some implementations, the identity provider 118 can rely upon a separate set of user account data or a user directory to determine whether to issue an authentication token to an application on behalf of the user. In other implementations, the user data 127 is a user directory associated with the identity provider 118, and the management service 116 accesses the user data 127 through an API provided by the identity provider 118.

User data 127 can include profile information about a user, authentication information about a user, applications that are installed on client devices 106 associated with the user, and other user information. For example, user data 127 can include information about client devices 106 that are associated with a user account of the user, enterprise resources to which a particular user has access, such as calendar data, documents, media, applications, network sites, or other resources, including certain applications that can act as communication channels for conversing with other users or team members, such as GITHUB, JIRA, MICROSOFT TEAMS, SLACK, SKYPE, email, telephone, etc. The user data 127 can also identify one or more user groups or teams of which a particular user is a member, which can in turn define the access rights of the user to one or more enterprise resources as well as identify which applications should be deployed to a client device 106 associated with the user. To this end, the user data 127 can further identify one or more device identifiers that can uniquely identify client devices 106 that are associated with a user account of the user.

User data 127 can also include activity data 134 and the knowledge graph(s) 136. Activity data 134 can represent usage data that can be collected by the management service 116, identity provider 118, tunnel server 120, and management component 145. Activity data 134 can represent network activity, such as via the tunnel server 120, application usage data, usage data as determined by activity on the identity provider 118 and other indications that a user is potentially working or using enterprise information technology resources.

Communication channels can be provided by various messaging services, such as an email service, chat service, whiteboard service, message board service, telephone service, etc. can be a computing environment that is operated by an enterprise, such as a business or other organization. The messaging service 107 includes a computing device, such as a server computer, that provides computing capabilities. Alternatively, the messaging service 107 can employ multiple computing devices that are arranged in one or more server banks or computer banks. In one example, the computing devices can be located in a single installation. In another example, the computing devices for the messaging service 107 can be distributed among multiple different geographical locations. In one case, the messaging service 107 includes multiple computing devices that together can form a hosted computing resource or a grid computing resource. Additionally, the messaging service 107 can operate as an elastic computing resource where the allotted capacity of computing-related resources, such as processing resources, network resources, and storage resources, can vary over time. In other examples, the messaging service 107 can include or be operated as one or more virtualized computer instances that can be executed to perform the functionality that is described herein.

The messaging service 107 can be hosted by a third party and provide messaging and/or chat services to users of the enterprise. Access to the messaging service 107 can be federated to the identity provider 118 in some examples. As an example, users can utilize a messaging client application, such as a chat or email client or a user interface generated by the messaging service 107 to access messages, calendar, contacts, and other data (e.g., client applications for GITHUB, JIRA, MICROSOFT TEAMS, SLACK, SKYPE, email, etc.). Users can also create email messages, appointments, meetings, and perform other tasks.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove, or update security certificates, or write, modify, or delete certain data from the client device 106. The management component 145 can also monitor network activity of the client device 106, the location of the client device 106, enforce password or personal identification number (PIN) requirements, or any other security or acceptable-use policies that are defined in the management service 116 and sent to the management component 145 over the network 119.

To carry out local management of a client device 106, the management component 145 can be installed and executed with elevated or administrative privileges on the client device 106. In some scenarios, the operating system can allow a particular application or package to be identified as a device owner or a device administrator.

One or more applications 147 can be installed on the client device 106, such as messaging client applications 149, such as such as an email client, chat client, whiteboard client, message board client, etc. (e.g., client applications for GITHUB, JIRA, MICROSOFT TEAMS, SLACK, SKYPE, etc.). As a managed device that is enrolled with the management service 116, some applications 147 can be installed by the management service 116. In one scenario, the management service 116 can send a request to the management component 145 to retrieve and install a particular application 147 on the client device 106. In this sense, installation of the application is initiated by the management service 116. The management service 116 can also provide configuration data for a particular application 147 that it installed on the client device 106.

The application 147 can be a browser or incorporate browser functionality, such as a WebKit or WebView component, that allows the application 147 to access browser-based data. In some scenarios, the application 147 can be a special-purpose application that accesses data and services provided by a service. In some examples, an application 147 can be instrumented to provide application usage data to the management service 116 or identity provider 118 when the application 147 is launched, during usage, and when a user may quit or log out of an application.

Another example of an application 147 can be an enterprise hub application or SSO application through which a user can authenticate his or her identity and access enterprise applications. Such an application can collect application usage data for applications associated with the enterprise and report the usage data to the management service 116 or the identity provider 118.

A messaging client application 149 can also be installed on a client device 106 and utilized to access messaging data, calendar data, contacts, and other information accessible using the messaging client application. The messaging client 149 can also obtain user availability from a messaging service 107.

A tunnel client 151 can be installed on a client device 106 to provide a VPN connection that is terminated at the tunnel server 120. The VPN connection can be an encrypted network connection that provides access to internal enterprise networks to the client device 106. The VPN connection, in some instances, can also simply encrypt network traffic between the client device 106 and the network 119 for security purposes. In some implementations, rather than utilizing a tunnel client 151 that sets up a VPN connection with the tunnel server 120, per-app VPN capabilities of an operating system of the client device 106 can be utilized.

According to examples of this disclosure, the communication channel assistant 121 can determine an optimal communication channel (e.g., particular messaging service) for contacting an individual by analyzing application usage data, network usage data, and/or user data, such as prior messages or conversations that occurred using messaging services, through network traffic detected using the tunnel client 151 or tunnel server 120. The analysis can involve interaction data between enterprise users such as responsiveness, usage rates, availability, etc. The application usage data can be detected using a hub application that provides access to enterprise applications installed on the client device 106 or that are hosted elsewhere. Application usage data can also be detected by analyzing user activity log data collected by the management service 116 and/or identity provider 118 corresponding to user logins, logouts, and application usage that can be detected or monitored on behalf of an enterprise.

The knowledge graph service 122 can generate or update a knowledge graph for a user periodically. As a general matter, a knowledge graph can refer to a representation that captures the salient knowledge about a particular task. A knowledge graph is a structured representation of facts containing entities, relationships, and semantic descriptions. The knowledge graph includes an array of interconnected nodes and each connection represents a relationship with its own properties or attributes. In some embodiments, a portion of the knowledge graph that includes group of nodes can be isolated or extracted, where each node represents various properties, objects, subjects, and constraints, in order to respond to a specific query. In many cases, knowledge graphs can store and convey in a single network a large collection of information. A generic semantic natural language processing engine can then be applied to user queries and retrieve the correct results from the knowledge graph.

Such knowledge graphs can be generated based on conversations or messages between enterprise users over various communication channels (e.g., messaging services) with channel or user metrics being determined and used to categorize which communication channels are preferred or suited for communication with specific individuals. In such knowledge graphs, each node in the graph can represent different users across various conversations, where the edges between the nodes can represent certain metrics, such as responsiveness, usage counts, client device in use, time of day, location, etc. In an illustrative example, a knowledge graph can be built by collating data from different enterprise communication sources, where the nodes of the graph represent an end user and the edges represent channel name, response time, total number of interactions, and/or topic metrics.

In various embodiments, an automated chatbot system can provide a front-end interface 150 to the communication channel assistant 121 and provide users with access to information and/or cause actions to be performed regarding one or more queries submitted to the chatbot interface. Based on the information provided by the knowledge graph, the communication channel assistant 121 can be equipped to answer user queries involving identification of a communication channel to be used in contacting an enterprise user.

In another aspect, the communication channel assistant 121 can obtain user activity data associated with the identity provider 118. Various applications and services are configured to utilize SSO and depend on the identity provider 118 API's for user authentication, providing authentication tokens, refresh tokens, and other authentication activity. In some cases, applications and services can communicate with the identity provider 118 whenever the user accesses the application. Accordingly, the identity provider 118 can generate usage logs for a respective user account within the enterprise. These usage logs can be provided to the knowledge graph service 122, which can use the usage logs to generate knowledge graph(s).

In another aspect, the knowledge graph service 122 can obtain user activity data associated with application usage on a client device 106 of the user. In some examples, a management component 145 running on a client device 106 that is managed by the management service 116 can report application usage data to the management service 116. The application usage data can include the identity of applications as well as a timestamp associated with usage. The application usage data can also be reported by applications on the client device 106 to the management service 116. In another aspect, the knowledge graph service 122 can obtain user activity data associated with VDI usage by a user. In some examples, a VDI infrastructure environment can report VDI usage data to the management service 116 or the identity provider 118. In another aspect, the knowledge graph service 122 can obtain user activity data associated with device usage of a client device 106 of the user. In some examples, a management component 145 or another application running on a client device 106 that is managed by the management service 116 can report device usage data to the management service 116.

Figure 2:
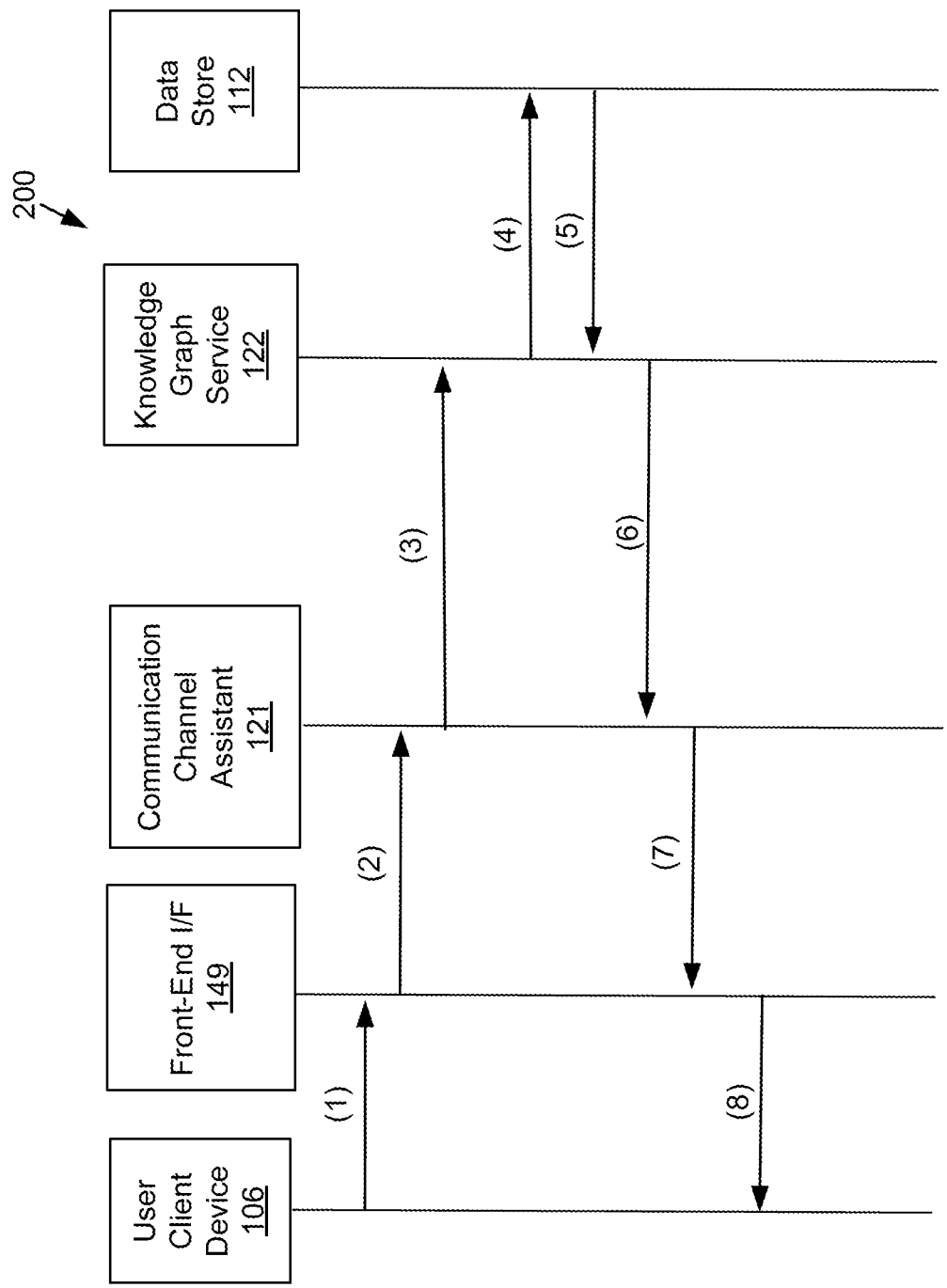
FIG. 2 shows an example of a service flow schematic of an exemplary enterprise communication channel assistance system of various embodiments of the present disclosure.

Referring next to FIG. 2, shown is an example of a service flow schematic that depicts operational steps within an exemplary embodiment of an enterprise communication channel assistance system. To illustrate the basic flow, a user client device 106 accesses (1) a chatbot client application as a front-end interface 150 to a communication channel assistant service 121. In an illustrative example, Mike interacts with the front-end interface 150 and queries the communication channel assistant 121 by asking, "What is the fastest way I could communicate with Dave?" Accordingly, in this example, the chatbot client relays (2) the query to the communication channel assistant service 121 along with related metadata or metrics, where the query may undergo processing by a natural language processing (NLP) parser to interpret and determine a context of the underlying query. As an example, the chatbot client can extract the following metadata from the example query:

Sender Mike (Metadata extracted: role, team, organization)

Receiver Dave (Metadata extracted: role, team, organization, location and also the client device on which Dave is currently active on and the communication applications used by him on that client device.)

Based on the context and the extracted metadata, the communication channel assistant service 121 calls on (3) a knowledge graph service 122 and obtains (4-5) a knowledge graph query based on the NLP query from a data store 112. For example, the communication channel assistant 121 may query the knowledge graph on the average response times for Dave across various communication channels and his interaction activity, such as if Dave is currently active on any communication channels or enrolled client devices. For example, there may be cases where enterprise users might prefer one client device over another, and there may only have certain messaging applications installed on certain client devices. Thus, based on which client device a user is currently active on, the response time might vary depending on the messaging application installed on that client device.

In various embodiments, the knowledge graph service 122 is continuously populated with dynamic information on the devices/apps being currently used by individual users and their location. This allows the knowledge graph 136 to be updated with dynamic user availability information based on an individual's location or device being used. The above-mentioned data is then used by the communication channel assistant 121 to answer questions and give suggestions to determine the best possible way to communicate with the user (Dave) in the fastest response time.

As such, the communication channel assistant service 121 may be provided (6) the average response times for Dave and his activity status and may use this information to determine the optimal communication channel for contacting Dave. If Dave is not currently active, the communication channel assistant 121 can query for additional information, such as Dave's last known location and/or past activity patterns. For example, based on whether the enterprise user is traveling and the user's current location, the user may have access to only certain messaging applications due to restrictions related to the current location.

After determining the optimal communication channel, the communication channel assistant service 121 returns (7) to the front-end interface (e.g., chatbot client) one or more optimal communication channels for contacting Dave. In various embodiments, a ranked list of communication channels may also include a channel score or grade for individuals in order to differentiate between the listed communication channels.

After the front-end client or interface 150 is provided the listing from the communication channel assistant service 121, the front-end interface 150 can display (8) the results to the user on the user's client device 106. In an illustrative example, the front-end interface 150 can present the results to the user with given contexts in Natural language as follows:

"The fastest way to communicate with Dave would be through Slack and Dave seems to be available there as well."

In some examples, the communication channel assistant 121 and/or knowledge graph service 122 can utilize a machine learning process that can operate on the application usage data, network usage data, and/or user data to determine a user's availability and willingness to communicate on a particular communication channel. The machine learning process can be trained on a set of application usage data, network usage data, and/or user data and the model can learn by incorporating whether a user is responsive based on a time of day, the user's location, the topic of the conversation, the sender, etc. As such, communication channels can be ranked based on various data points, where these data points can be used to train machine learning or statistical models so that a knowledge graph service 122 and/or an communication channel assistant service 121 can determine and flag optimal communication channels.

Figure 3:
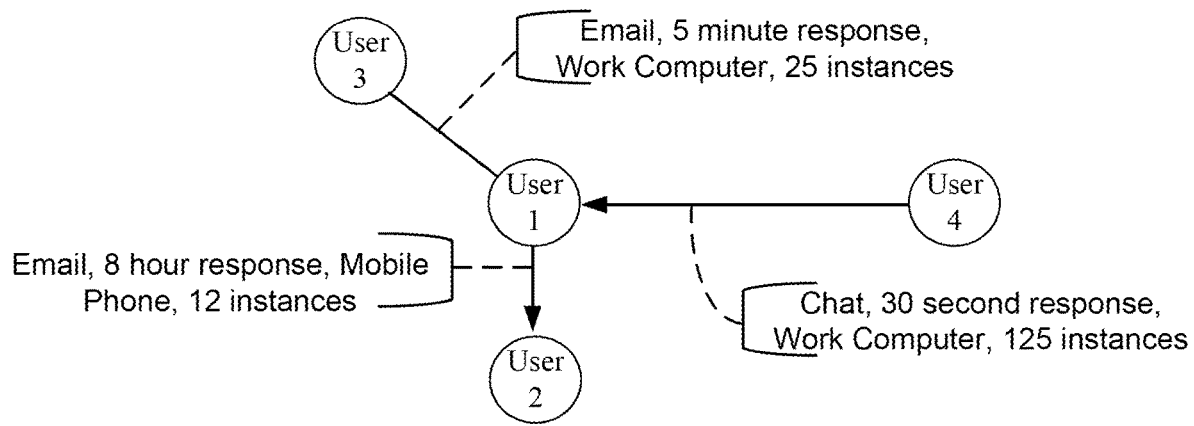
FIG. 3 shows an example knowledge graph according to an example of the disclosure.

Referring next to FIG. 3, shown is an example knowledge graph 300 that can be generated by the knowledge graph service 122 and used by the communication channel assistant 121. In the illustrative example shown, individual users (User 1, User 2, User 3, and User 4) are represented as nodes in the knowledge graph 300, where the users may be members of a same work group or team within an enterprise.

In one example, the knowledge graph 300 represents messages between User 1 and other users in the enterprise. In the example of FIG. 3, User 1 and User 3 have participated in communications via email on 25 instances, where the average response time for User 1 is 5 minutes when User 1 is communicating over his work computer. Correspondingly, User 1 and User 2 have communicated via email on 12 instances, where the average response time is 8 hours for User 1 when the communications take place on User 1's mobile phone. And, User 1 and User 3 have communicated via a chat session on 125 instances, where the average response time is 30 seconds for User 1 when User 1 is communicating using his or her work computer. Thus, based on the knowledge graph 300, the communication channel assistant 121 service can predict that User 1 will be most responsive on a chat communication channel via User 1's work computer.

Figure 4:
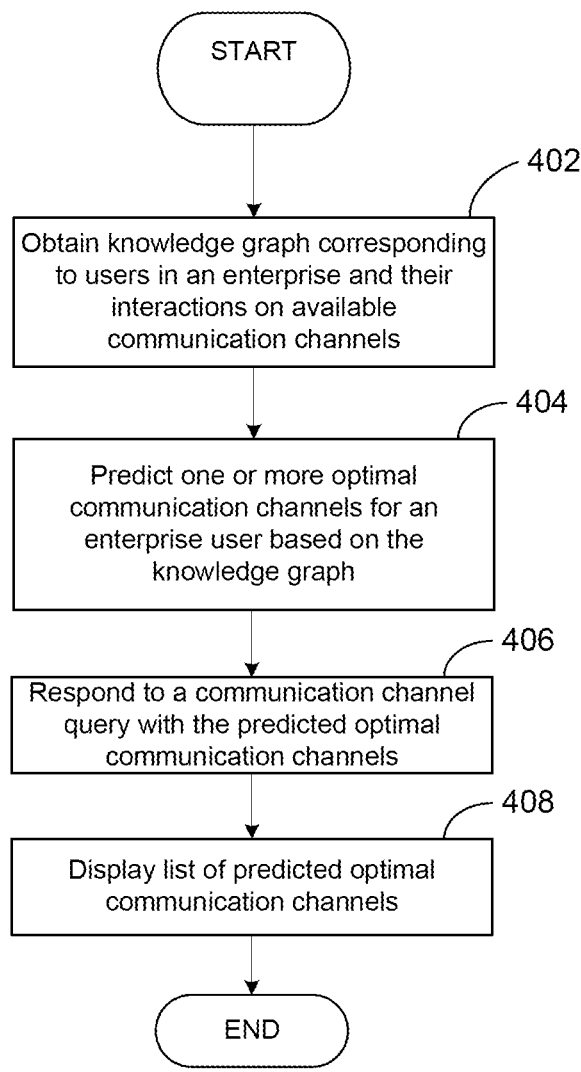
FIG. 4 is a flowchart that provides one example illustrating operations of an enterprise communication channel assistance system in accordance with various embodiments of the present disclosure.

Referring next to FIG. 4, shown is a flowchart that provides one example of how the communication channel assistant 121 can provide a communication channel prediction to a requesting client, such as a front-end client or interface 150. Correspondingly, at step 402, the communication channel assistant 121 can obtain a knowledge graph 136 representing user interactions on available communication channels within an enterprise environment. The user interactions can be reflected in application usage data collected from various sources, such as messages exchanged between users of the enterprise via one or more messaging servers 107. The communication channel assistant 121 can obtain user activity data associated with network traffic between a client device 106 assigned to the user and a tunnel server 120 associated with the enterprise.

At step 404, the communication channel assistant 121 can predict one or more optimal communication channels for messaging a user identified in the knowledge graph. An optimal communication channel can be identified from counts or instances of conversations that the user has with other users across various communication channels and messaging platforms available in the enterprise environment. Thus, in some examples, the counts can be a weighted sum of user activity detected from various usage data inputs.

At step 406, the communication channel assistant 121 can respond to a request for identification of an optimal communication channel with a list or ranking of the predicted optimal communication channel(s). In some examples, the initial request can be a query from a front-end interface 150, such as a chatbot client, that is directed to the communication channel assistant 121. Accordingly, in other examples, the initial request can be received from other front-end clients, such as an email client, a web client, or any other messaging or chat service clients.

At step 408, a client device 106 of the user can be provided, from the communication channel assistant 121, the list of optimal communication channels and display the list on client device 106. In various embodiments, the displayed list may include links or selectable options to initiate messaging or a conversational dialogue using a communication channel specified in the list. In certain embodiments, the provided links or options may be sorted based on which platforms are preferred by the requesting user. Alternatively, in various embodiments, the communication channel assistant 121 can automatically direct a messaging service associated with the top-ranked communication channel for a specific user to initiate a messaging session between the requesting user and the specific user. In such embodiments, in lieu of asking the communication channel assistant 121 to identify an optimal communication channel, the requesting user can direct the communication channel assistant 121 to automatically send a message to a specific user using whichever communication channel is identified by the communication channel assistant 121 as the optimal choice. In certain embodiments, the communication channel assistant 121 may be operable to select a communication channel corresponding to a messaging application that is installed on the client device in current use by the specific user from multiple optimal communication channels, where the front-end interface 150 is operable to automatically send a message to the specific user over the selected communication channel.

The flowchart of FIG. 4 shows an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 4 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, identity provider 118, communication channel assistant 121, knowledge graph service 122, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

What is claimed is:

1. A system comprising:
   at least one computing device;
   at least one application executed by the at least one computing device, wherein the at least one application causes the at least one computing device to at least:
   obtain application usage data corresponding to user interactions, by a plurality of enterprise users, on available communication channels within an enterprise environment;
   generate from the application usage data a plurality of knowledge graphs, each knowledge graph representing an individual enterprise user communicating over two or more of the available communication channels with other enterprise users;
   obtain a request to provide an optimal communication channel for contacting the individual enterprise user, wherein the request is received from a front-end interface to the at least one application; and
   based on the knowledge graph representing the individual enterprise user, provide at least one optimal communication channel for contacting the individual enterprise user to the front-end interface, wherein the at least one optimal communication channel is represented in the knowledge graph.

2. The system of claim 1, wherein the front-end interface comprises a chatbot client.

3. The system of claim 1, wherein the application usage data is obtained from at least one of a management service or an identity manager, the management service remotely managing a client device associated with the individual enterprise user and the identity manager comprising a single sign-on service associated with the individual enterprise user.

4. The system of claim 3, wherein application usage data comprises data measured by a management component running on a client device associated with the individual enterprise user, wherein the management component reports application usage to the management service.

5. The system of claim 1, wherein the application usage data comprises response times of the individual enterprise user.

6. The system of claim 1, wherein the application usage data indicates a client device in current use by the individual enterprise user.

7. The system of claim 6, wherein the at least one application causes the at least one computing device to at least select a communication channel corresponding to a messaging application that is installed on the client device in current use by the individual enterprise user from the at least one optimal communication channel.

8. The system of claim 1, wherein the front-end interface automatically sends a message to the individual enterprise user over the selected communication channel.

9. A non-transitory computer-readable medium comprising machine-readable instructions, wherein the instructions, when executed by at least one processor, cause a computing device to at least:
   obtain application usage data corresponding to user interactions, by a plurality of enterprise users, on available communication channels within an enterprise environment;
   generate from the application usage data a plurality of knowledge graphs, each knowledge graph representing an individual enterprise user communicating over two or more of the available communication channels with other enterprise users;
   obtain a request to provide an optimal communication channel for contacting the individual enterprise user, wherein the request is received from a front-end interface; and
   based on the knowledge graph representing the individual enterprise user, provide at least one optimal communication channel for contacting the individual enterprise user to the front-end interface, wherein the at least one optimal communication channel is represented in the knowledge graph.

10. The non-transitory computer-readable medium of claim 9, wherein the application usage data is obtained from at least one of a management service or an identity manager, the management service remotely managing a client device associated with the individual enterprise user and the identity manager comprising a single sign-on service associated with the individual enterprise user.

11. The non-transitory computer-readable medium of claim 10, wherein application usage data comprises data measured by a management component running on a client device associated with the individual enterprise user, wherein the management component reports application usage to the management service.

12. The non-transitory computer-readable medium of claim 9, wherein the application usage data comprises response times of the individual enterprise user.

13. The non-transitory computer-readable medium of claim 9, wherein the application usage data indicates a client device in current use by the individual enterprise user.

14. The non-transitory computer-readable medium of claim 13, wherein the instructions, when executed by at least one processor, cause a computing device to at least select a communication channel corresponding to a messaging application that is installed on the client device in current use by the individual enterprise user from the at least one optimal communication channel.

15. A method comprising:
   obtaining, via a computing device, application usage data corresponding to user interactions, by a plurality of enterprise users, on available communication channels within an enterprise environment;

generating, via the computing device, from the application usage data a plurality of knowledge graphs, each knowledge graph representing an individual enterprise user communicating over two or more of the available communication channels with other enterprise users;

obtaining, via the computing device, a request to provide an optimal communication channel for contacting the individual enterprise user, wherein the request is received from a front-end interface; and providing, via the computing device based on the knowledge graph representing the individual enterprise user, at least one optimal communication channel for contacting the individual enterprise user to the front-end interface, wherein the at least one optimal communication channel is represented in the knowledge graph.

16. The method of claim 15, wherein the application usage data is obtained from at least one of a management service or an identity manager, the management service remotely managing a client device associated with the individual enterprise user and the identity manager comprising a single sign-on service associated with the individual enterprise user.

17. The method of claim 16, wherein application usage data comprises data measured by a management component running on a client device associated with the individual enterprise user, wherein the management component reports application usage to the management service.

18. The method of claim 15, wherein the application usage data comprises response times of the individual enterprise user.

19. The method of claim 15, wherein the application usage data indicates a client device in current use by the individual enterprise user.

20. The method of claim 19, further comprising selecting, via the computing device, a communication channel corresponding to a messaging application that is installed on the client device in current use by the individual enterprise user from the at least one optimal communication channel.

* * * * *